No. 654,479. Patented July 24, 1900.
R. J. McNALLY.
FILTER.
(Application filed Apr. 21, 1900.)
(No Model.)
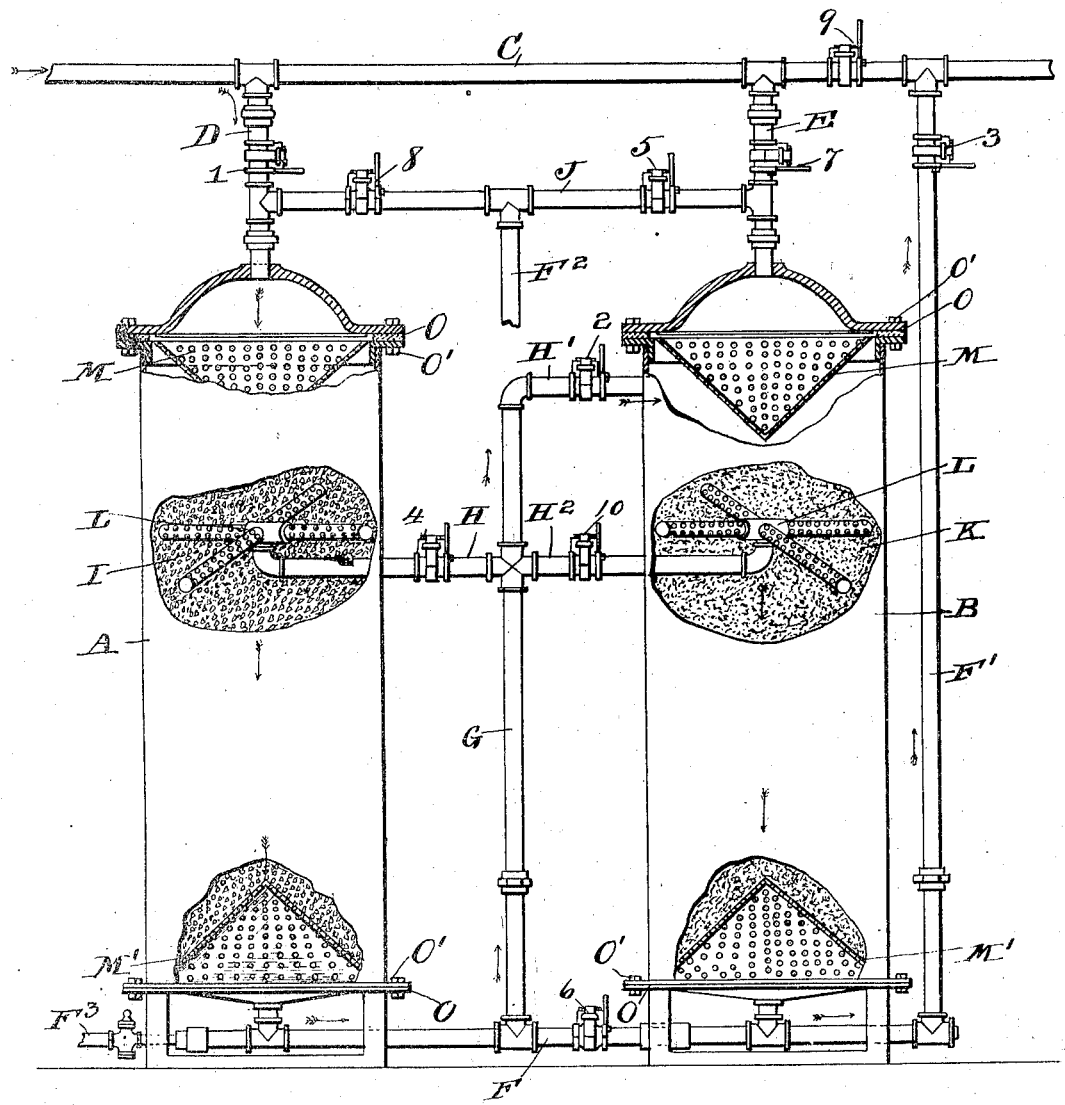
WITNESSES
INVENTOR
Robert J. McNally

UNITED STATES PATENT OFFICE.

ROBERT J. McNALLY, OF PHILADELPHIA, PENNSYLVANIA.

FILTER.

SPECIFICATION forming part of Letters Patent No. 654,479, dated July 24, 1900.

Application filed April 21, 1900. Serial No. 13,791. (No model.)

*To all whom it may concern:*

Be it known that I, ROBERT J. MCNALLY, a citizen of the United States, residing at Philadelphia, (Germantown,) in the county of Philadelphia and State of Pennsylvania, have invented certain new and useful Improvements in Filters; and I do hereby declare the following to be a full, clear, and exact description of the invention, such as will enable others skilled in the art to which it appertains to make and use the same.

My invention relates to filters of that class consisting of two cylinders connected with the main pressure service-pipe of dwellings and other buildings whereby the entire supply of water, whether for bathing, drinking, cooking, or other purposes, is clarified before use first in one cylinder and then in the other.

One object of my improvements is to so arrange the water distribution that each and every part of the filter, as well as the filtering material, may be cleansed in one operation, that the course of the water may be changed so as to cleanse the cylinders in the opposite directions, and that certain portions of the filter may be alone and independently cleansed and all the cleansing done without removing any part of the apparatus.

Another object of my invention is to improve the means for loosening the filtering material within each cylinder and to prevent its packing, at the same time to prevent the clogging of the loosening feature by the filtering material and to prevent the wear and disintegration of strainers within the cylinders by the frequent and opposite lifting and depressing pressures of the water and filtering material; and, finally, another object is to construct a filter which may be operated as a whole as a duplex filter, but which is also capable of being operated and cleaned as a single-cylinder filter entirely independent of the other.

My invention is illustrated in the accompanying drawing, which is a side view in elevation, partly in section, showing the water supply and distribution pipe system and controlling valves and cocks in connection with the filtering-cylinders and accompanying features.

Referring to the drawings, A and B are two cylinders, the first cylinder A being provided with ground flint or similar coarse material I, the sharp and ragged edges of which catch and retain the heavier and grosser impurities, such as mud, &c., and the second cylinder B provided with "bone-coal" or other equivalent of animal charcoal at K to additionally clarify and purify the water.

At the top and bottom of each filter is placed a detachable perforated cone M M'. Each of these cones has a bottom plate and washer O, both ends of which plate and washer extend out of the walls of the cylinder and are there united by a nut and screw-bolt O', by which means the cones can be easily detached from a cylinder when worn or damaged and a new one substituted, thus constituting a great advantage over those cones which are made integral with the cylinder-casing. It will be noticed that each cone at its base extends practically the entire width of the cylinder, thus giving the utmost cone-surface to the water and preventing any clogging-spaces about it. The apex of each upper cone M extends down to the center of the top surface of the filtering material, and by reason of this location and the form and strength of the conical part it has this advantage over a horizontal perforated diaphragm that it is not subject to an alternate up-and-down movement and strain caused by the up-and-down strong pressure of the water when forced in and out of the filter, which constant alternate pressure soon weakens the edges of a horizontal strainer, and again the inwardly-extended walls of the cone prevent to a greater extent the rising and carrying away of the finer and pulverulent filtering material borne outward by the force of the water, and finally the conical extended form presents a greater surface to the water and obviates the clogging to which horizontal diaphragms are subject. For these reasons I find the employment of the cones, particularly at the top of the cylinders, especially desirable and advantageous.

Referring now to the pipe system, C is the main service inlet-pipe, to which the first cylinder A is connected by branch pipe D and the second cylinder B by the branch pipe E. The pipe C is provided with a stop-valve 9 to throw the water through the said branch pipes to the filter or permit the water to run through without passing through the filter.

Branch pipe D is provided with stop-valve 1 and pipe E with valve 7 to control admission of water to and from the separate cylinders.

J is a pipe connecting the cylinder branch pipes D and E, and F² is a wash-out pipe connected to the center of pipe J. On each side of the wash-out pipe the pipe J is provided with stop-valves 5 and 8 to control independently the outflow of water from the cylinders A B.

F is a horizontal pipe at the bottom of the filter connecting cylinders A B and governed by stop-valve 6. To the right-hand end of pipe F, as shown in this illustration, a vertical pipe F' is connected to the right-hand cylinder B. Pipe F' is for the filtered water and leads into the service-pipe C. It is governed by stop-valve 3.

F³ is a drain-pipe leading out from the bottom of the filter on the left side.

G is a central vertical pipe opening at its foot into bottom pipe F and at its top provided with a horizontal branch H', leading into the top of the second cylinder B. The branch H' is provided with stop-valve 2. H and H² are horizontal branches of vertical pipe G and extend in opposite directions into the respective cylinders A B and into the body of the filtering material therein placed. These branch pipes are respectively provided with stop-valves 4 and 10, controlling the flow of water from vertical pipe G to either of the filter-cylinders. The pipes H and H², leading into the bodies of the cylinders, are each provided at their inner end with a set of diverging perforated pipes L. The pipes L are perforated alone on their upper sides or surface. They are located in the body of the filtering material, and their function is to stir up by the force of the jets of water thrown through them the surrounding material to prevent it from packing and to lift and loosen the deposit that forms in and on top of the filtering-beds when the filter-cylinders are washed out.

The usual operation of filtering is as follows: Let the stop-valve 9 in the service-pipe be closed to shut off direct flow, as through the building, also valve 7 in the branch of the right-hand cylinder, valves 5 and 8 in the wash-out pipe J, valves 4 and 10 in pipes H H², leading into body of the cylinders, valve 6 in pipe F, leading into bottom of right-hand cylinder, and let valve 1 in branch pipe of cylinder A be open, pipe F open from cylinder to vertical pipe G, and pipe G open to top of second cylinder. Then the flow of water is, as indicated by the arrows in the drawing, first from the service-pipe into cylinder A, through the top cone M, through the body of the flint material I, through the bottom cone M', thence into pipe F, thence up pipe G into top of second cylinder B, thence down through the bone-coal material and lower cone M'. The water has now been filtered in both cylinders and then passes up pipe F' into the service-pipe and then through the house. It will be readily seen how, by closing the other pipes filtering can be done through the first cylinder A only through pipe D into said cylinder, along pipe F, and upward through the filtered-water pipe F', and how, if desired, the water can alone be filtered in cylinder B by leading it through pipe E into said cylinder and thence into pipes F and F'. The same system in the matter of cleansing can be followed.

In cleansing the entire filter it is desirable, first, as a preliminary step to loosen and raise up the top deposit of impure and sedimentary matter collecting on the upper portions of the filtering material in both cylinders A and B. To this end water is led into cylinder A through pipe D, thence down into pipe F, thence up pipe G, thence into the opposite branch pipes H H², from whence it escapes with force through perforated pipes L in the body of the material, lifting up and loosening the same, the pipe leading into top of cylinder B being in the meantime closed by valve 2 and the flow out of pipe F by the valve 6. Then when the top deposits are thus sufficiently loosened and stirred up branch pipes H H² are closed by valves 10 and 4, pipe F opened by valve 6, water flows into the bottom of cylinder B, up through it into pipe E, into upper cross-pipe J, valve 5 therein being opened, and out of the wash-out pipe F², valve 8 in the other branch of pipe J being closed. Then to cleanse cylinder A a reverse movement takes place, ingress-pipe D is closed and pipe E into top of cylinder B is opened, water flows through the latter down to pipe F, along the left to bottom of cylinder A, up through that cylinder to pipe J, valve 8 having been opened, and out of the wash-out pipe F².

If but one cylinder is being used or if it is found necessary to cleanse the material in but one cylinder, one of the pipes H H² is closed, so that water can be forced alone into the opposite pipe. Water falling at the bottom of either cylinder during the operation of cleansing is led out by drain-pipe F³, communicating with pipe F.

It will thus be seen that in the duplex system of filters herein illustrated and described independent operations can be had for the purpose of filtering the water and cleansing the filters and adapted also to operate on each particular part of the filter to the exclusion of the others and both cylinders and every part are cleaned with filtered water. The appearance of the water after a wash-out will indicate when the cleansing operation may cease and whether it has been thoroughly done.

A little experience will soon make the operation of the filter readily understood and also determine the times for cleansing the filter. As before stated, there are no parts to be removed in the washing-out process and only the proper manipulation of the stop-valves is to be learned.

I am aware that similar systems of filtering and cleansing have been employed and that parts similar to the separate features herein described are old in other constructions; but what I claim is—

In a duplex filter the combination with the two cylinders each provided with filtering material, of top and bottom detachable perforated cones in each cylinder, a main service and pipe distribution system provided with suitable stop-valves, a loosening and stirring device in each cylinder consisting of branch horizontal pipes perforated in their upper surface and extending through the body of the filtering material, a larger horizontal pipe to which said branches are connected, said larger pipe provided with a stop-valve, a vertical central pipe to which said horizontal pipe and its branches are connected, and the feed and main pressure-pipes and their valve-stops, whereby the filtering material in each or both of the cylinders may be loosened and stirred at the same time or independently, substantially as described.

In testimony whereof I affix my signature in presence of two witnesses.

ROBERT J. McNALLY.

Witnesses:
M. E. WITHAM,
E. D. BOGGS.